US009645430B2

(12) United States Patent
Nakano

(10) Patent No.: US 9,645,430 B2
(45) Date of Patent: May 9, 2017

(54) DISPLAY DEVICE WITH TOUCH PANEL

(71) Applicant: Japan Display Inc., Tokyo (JP)

(72) Inventor: Yasushi Nakano, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 13/952,924

(22) Filed: Jul. 29, 2013

(65) Prior Publication Data

US 2014/0028939 A1 Jan. 30, 2014

(30) Foreign Application Priority Data

Jul. 30, 2012 (JP) ................................. 2012-168371

(51) Int. Cl.
*G02F 1/1333* (2006.01)
*G06F 3/041* (2006.01)
*G06F 3/044* (2006.01)

(52) U.S. Cl.
CPC ........ *G02F 1/13338* (2013.01); *G06F 3/0412* (2013.01); *G06F 3/044* (2013.01)

(58) Field of Classification Search
CPC ... G02F 1/13338; G02F 1/1352; G06F 1/0412
See application file for complete search history.

(56) References Cited

U.S. PATENT DOCUMENTS

| 2001/0033355 A1* | 10/2001 | Hagiwara | 349/152 |
| 2002/0030658 A1* | 3/2002 | Kim | G02F 1/1345 345/92 |
| 2003/0189686 A1* | 10/2003 | Hirosue et al. | 349/149 |
| 2010/0182273 A1 | 7/2010 | Noguchi et al. | |
| 2011/0141042 A1* | 6/2011 | Kim et al. | 345/173 |

FOREIGN PATENT DOCUMENTS

| CN | 1310475 A | 8/2001 |
| CN | 102096221 A | 6/2011 |
| JP | 2001-313308 A | 11/2001 |
| JP | 2008-129397 A | 6/2008 |
| JP | 2009-244958 | 10/2009 |

(Continued)

OTHER PUBLICATIONS

Korean Office Action for Korean Patent Application No. 10-2013-89851, dated Aug. 14, 2014.

(Continued)

*Primary Examiner* — Jessica M Merlin
(74) *Attorney, Agent, or Firm* — Typha IP LLC

(57) ABSTRACT

A display device with a touch panel includes: a thin film transistor substrate on which thin film transistors are formed; and a counter substrate arranged to face the thin film transistor substrate, wherein the counter substrate includes detection electrodes extending in one direction across a display area and detecting a contact position when a contact from the outside is made on the display area, and a plurality of electrode terminals connected to the detection electrodes, a flexible board for the electrode terminals to extract a signal from the detection electrodes is connected to the counter substrate, and an arrangement pitch of a plurality of terminals of the flexible board and an arrangement pitch of the plurality of electrode terminals are different from each other.

21 Claims, 8 Drawing Sheets

(56) References Cited

FOREIGN PATENT DOCUMENTS

| | | |
|---|---|---|
| JP | 2012-68981 A | 4/2012 |
| KR | 10-2008-0048961 A | 6/2008 |
| TW | 594274 B | 6/2004 |
| TW | 201106243 A | 2/2011 |

OTHER PUBLICATIONS

Japanese Office Action of May 10, 2016, for corresponding Japanese Patent Application No. 2012-168371 with partial English Translation.
Office Action dated Jul. 30, 2015 regarding a corresponding Chinese Patent Application No. 201310331892.9.

* cited by examiner

DISPLAY DEVICE WITH TOUCH PANEL

CROSS-REFERENCE TO RELATED APPLICATION

The present application claims priority from Japanese application JP2012-168371 filed on Jul. 30, 2012, the content of which is hereby incorporated by reference into this application.

BACKGROUND OF THE INVENTION

1. Field of the Invention

The present invention relates to a display device with a touch panel.

2. Description of the Related Art

In recent years, in information communication terminals such as computers, display devices with a touch panel input function that are configured by placing a touch panel on a display device have been widely used. Among them, a liquid crystal display device is generally in widespread use as a device to provide a display function. The liquid crystal display device is a device that changes, using a change in electric field, the alignment of a liquid crystal composition contained between two substrates of a thin film transistor substrate (hereinafter referred to as TFT (Thin Film Transistor) substrate) and a color filter substrate and controls the degree of light transmission to thereby display an image. In such a liquid crystal display device, an IPS (In Plane Switching) system has been widely used in which a so-called lateral electric field is formed by arranging both of pixel electrodes and common electrodes on the TFT substrate side to realize wide-viewing angle display.

A touch panel is an input device that recognizes coordinates on a panel touched using a user s finger or the like and causes a processing device to perform processing based on the coordinates. In the touch panel, a resistive film system that detects a change in the resistance value of a touched portion, an optical sensor system that detects a change in the light intensity of a portion blocked by a touch, an electrostatic capacitive coupling system that detects a change in capacitance, and the like have been known. The electrostatic capacitive coupling system has been widely used because, for example, it has high panel transmittance and thus does not reduce display image quality and it has high durability with no contact with other electrodes.

In recent years, due to the demand for reductions in the size and thickness of information communication terminals, a further reduction in the thickness of the liquid crystal display device with a touch panel has been required. JP 2009-244958 A discloses, in liquid crystal display devices of the IPS system, a liquid crystal display device with a touch panel whose further reduction in thickness is achieved by using common electrodes of the liquid crystal display device as drive electrodes of the touch panel.

For extracting a signal from a wiring on a glass substrate of a TFT substrate, a flexible cable such as an FPC (Flexible Printed Circuit) is generally connected using a conductive adhesive material such as an ACF (Anisotropic Conductive Film). In this case, a portion of the TFT substrate at which the FPC is connected is transparent and thus visible from the opposite side of the TFT substrate surface on which the FPC is connected. Therefore, by previously preparing an alignment mark on the TFT substrate at the stage of a thin film formation step, the FPC can be connected with high accuracy while viewing the alignment mark.

On the other hand, in the liquid crystal display device with a touch panel disclosed in JP 2009-244958 A, since a detection electrode for touch detection is arranged on a color filter substrate, a signal has to be extracted from over the color filter substrate. However, since alight shielding film is formed at the peripheral portion of the color filter substrate and the portion is not transparent, alignment using an alignment mark in the same manner as in the TFT substrate is difficult.

SUMMARY OF THE INVENTION

The invention has been made in view of the circumstances described above, and it is an object of the invention to provide a display device with a touch panel in which an electric signal can be extracted from over a color filter substrate.

A display device with a touch panel according to an exemplary embodiment of the invention includes: a thin film transistor substrate on which thin film transistors are formed corresponding to pixels formed in a display area; and a counter substrate arranged to face the thin film transistor substrate. The counter substrate includes, on its back surface, a light shielding film surrounding the display area and forming a light shielding area surrounding the display area. The counter substrate includes, on its front surface, a plurality of detection electrodes extending in one direction across the display area and detecting a contact position when a contact from the outside is made on the display area, and a plurality of electrode terminals connected to the detection electrodes. A flexible board for extracting a signal from the detection electrodes is connected to the counter substrate, and the flexible board has a plurality of flexible board terminals. The electrode terminals and the flexible board terminals are connected in the light shielding area, and an arrangement pitch of the plurality of flexible board terminals and an arrangement pitch of the plurality of electrode terminals are different from each other.

In the display device with a touch panel according to the exemplary embodiment of the invention, the counter substrate may be a color filter that transmits light in a predetermined wavelength range for each of the pixels, and the detection electrode and the electrode terminal may be each formed of a transparent conductive film.

In the display device with a touch panel according to the exemplary embodiment of the invention, each of the plurality of electrode terminals may be electrically connected with two or more of the flexible board terminals, and a portion of the plurality of flexible board terminals may be a dummy terminal that is in an electrically floating state in the flexible board.

In the display device with a touch panel according to the exemplary embodiment of the invention, the dummy terminal may be formed at the arrangement pitch of the plurality of electrode terminals.

In the display device with a touch panel according to the exemplary embodiment of the invention, two or more of the dummy terminals may be successively arranged.

DETAILED DESCRIPTION OF THE INVENTION

Figure 1:
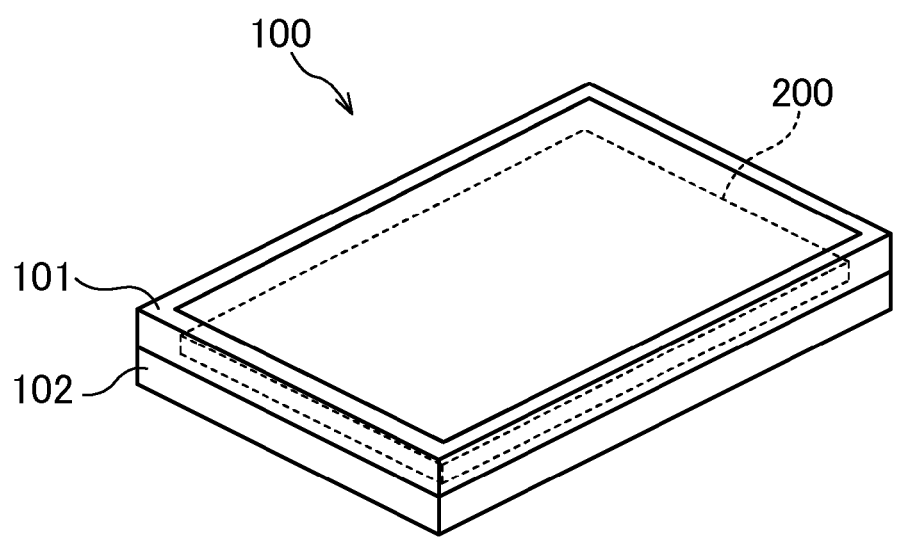
FIG. 1 shows a display device with a touch panel according to an embodiment of the invention.

Hereinafter, an embodiment of the invention will be described with reference to the drawings. In the drawings, the same or equivalent elements are denoted by the same reference character, and repetitive description is omitted.

FIG. 1 shows a display device with a touch panel 100 according to the embodiment of the invention. As shown in the drawing, the display device with a touch panel 100 includes a display panel with a touch panel 200, and an upper frame 101 and a lower frame 102 that fix the display panel with a touch panel 200 so as to interpose the display panel therebetween.

Figure 2:
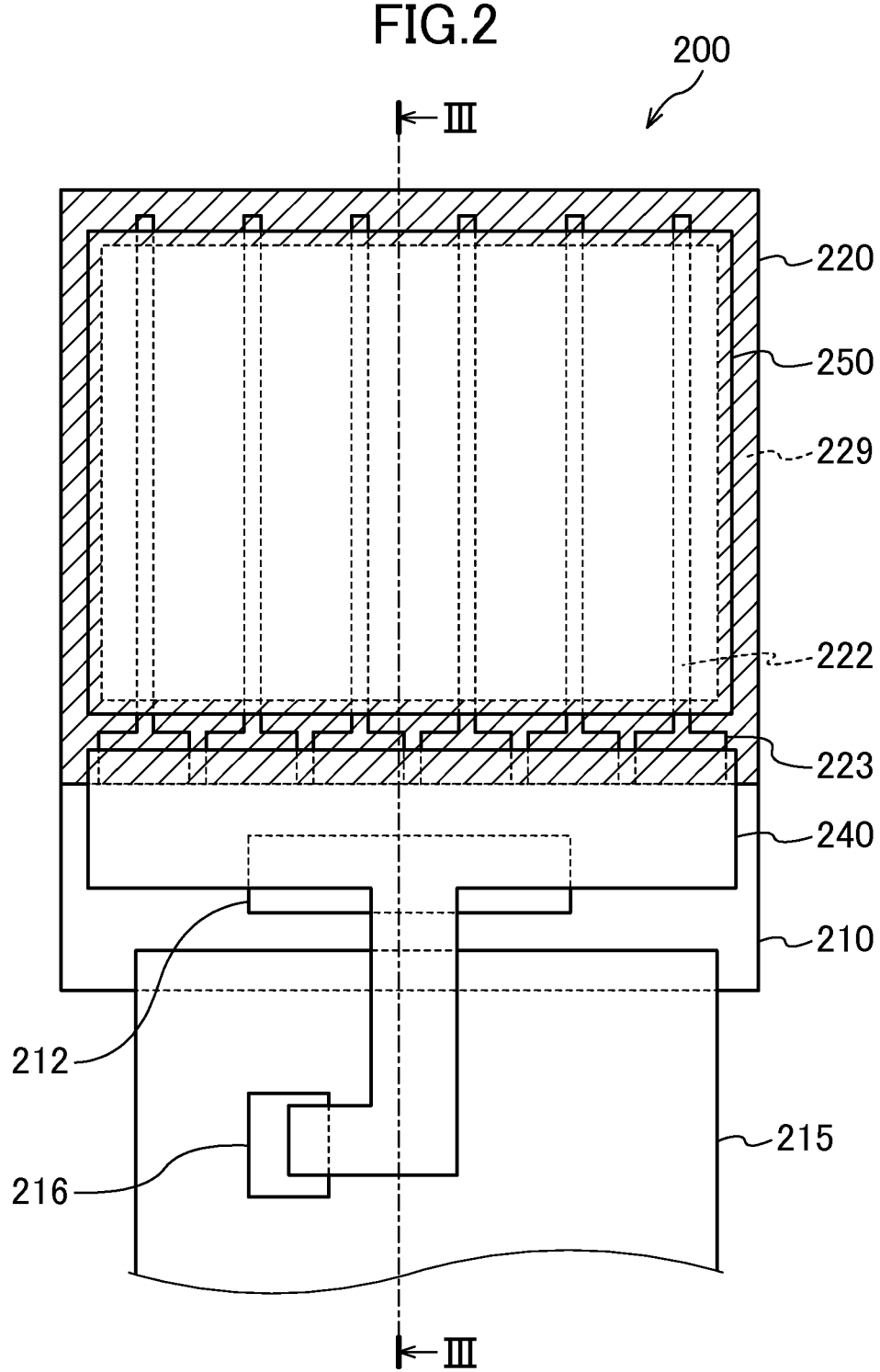
FIG. 2 schematically shows a display panel with a touch panel in FIG. 1.

FIG. 2 schematically shows the display panel with a touch panel 200. A liquid crystal display device with a touch panel according to the embodiment of the invention includes a thin film transistor substrate on which thin film transistors are formed corresponding to pixels formed in a display area and a counter substrate arranged to face the thin film transistor substrate.

The counter substrate includes, on its back surface, a light shielding film surrounding the display area. The light shielding film forms a light shielding area surrounding the display area. Moreover, the counter substrate includes, on its front surface, a plurality of detection electrodes and a plurality of electrode terminals. The detection electrodes extend in one direction across the display area, and detect a contact position when a contact from the outside is made on the display area. The electrode terminals are connected to the detection electrodes. Further, a flexible board for extracting a signal from the detection electrodes is connected to the counter substrate.

The flexible board includes a plurality of flexible board terminals for connecting with the electrode terminals. The electrode terminals and the flexible board terminals are connected in the light shielding area. An arrangement pitch of the plurality of flexible board terminals and an arrangement pitch of the plurality of electrode terminals are formed to be different from each other.

Hereinafter, a liquid crystal display panel with a touch panel will be described as an example of the display panel with a touch panel. In the case of the liquid crystal display device with a touch panel, the counter substrate is a color filter substrate, and the light shielding film is a black matrix.

The liquid crystal display panel with a touch panel 200 includes a TFT substrate 210 and a color filter substrate 220 overlapped with the TFT substrate 210 with a liquid crystal composition sealed therebetween. A driver IC (Integrated Circuit) 212 for driving transistors in pixels of the TFT substrate is arranged on the TFT substrate 210. Further, a TFT flexible board 215 for inputting a signal from the outside to the driver IC 212 is attached to the TFT substrate 210.

On the other hand, the color filter substrate 220 has a light shielding film 229, touch panel detection electrodes 222, transparent electrode terminals 223, and an upper polarizer 250. The light shielding film 229 is formed, for preventing light leakage, around a display area in which pixels each having R (red), G (green), and B (blue) color filters are arranged. The touch panel detection electrodes 222 are a plurality of parallel-arranged electrodes extending in one direction in the display area, and detect a contact on a screen. Each of the transparent electrode terminals 223 is connected integrally from the touch panel detection electrode 222 and formed outside the display area. The upper polarizer 250 is arranged so as to cover the display area of the color filter substrate 220. An area surrounding the image display area and formed with the light shielding film 229 is a light shielding area. Further, a CF (Color Filter) flexible board 240 that connects the transparent electrode terminals 223 of the color filter substrate 220 with a terminal 216 of the TFT flexible board 215 and transmits a touch detecting signal from the color filter substrate 220 is connected to the color filter substrate 220. The transparent electrode terminals 223 and the terminal 216 of the flexible board 215 are connected in the light shielding area.

Figure 3:
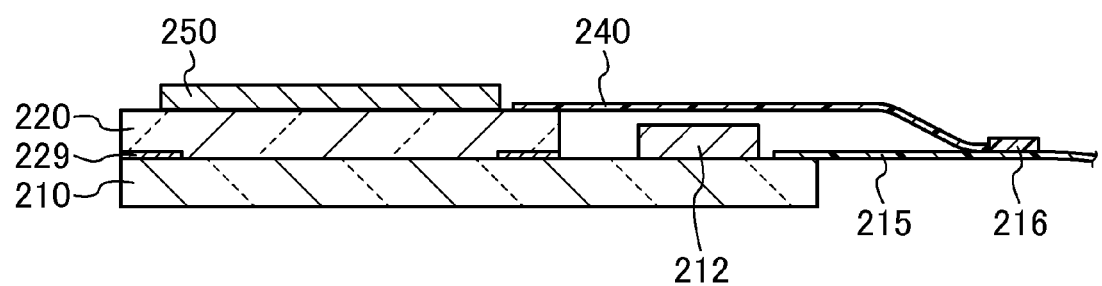
FIG. 3 schematically shows a cross section taken along line III-III in FIG. 2.

FIG. 3 schematically shows a cross section taken along line III-III in FIG. 2. The TFT substrate 210 and the TFT flexible board 215, and the color filter substrate 220 and the CF flexible board 240 are bonded together with ACFs (Anisotropic Conductive Films) (not shown). As shown in the drawing, a position at which the CF flexible board 240 is connected on the color filter substrate 220 is a position overlapping with the light shielding film 229.

Figure 4:
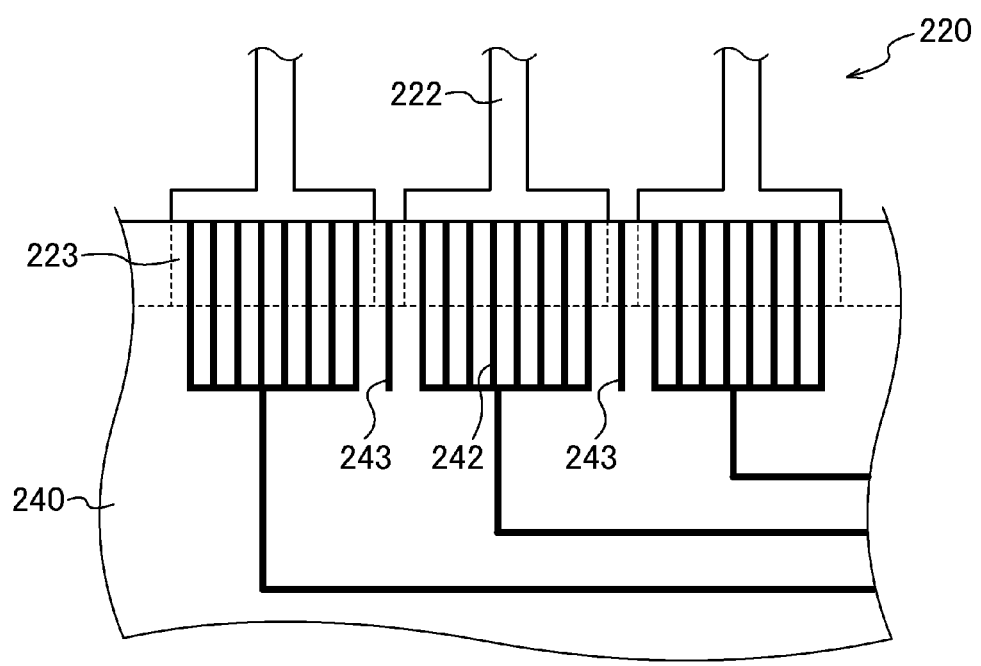
FIG. 4 shows in detail a connecting portion between a flexible board and a counter substrate in an enlarged manner.

FIG. 4 shows in detail a connecting portion between the CF flexible board 240 and the color filter substrate 220. As shown in the drawing, each of the transparent electrode terminals 223 formed continuously with the touch panel detection electrode 222 on the color filter substrate 220 extends to an edge of the color filter substrate 220. Moreover, the CF flexible board 240 has flexible board terminals 242 and 243 formed at an arrangement pitch different from that of the transparent electrode terminals 223. Especially in the embodiment, the flexible board terminals 242 and 243 are formed at a smaller arrangement pitch than that of the transparent electrode terminals 223. Eight flexible board terminals 242 are connected to one transparent electrode terminal 223. The eight flexible board terminals 242 are connected in the flexible board 240. The flexible board terminal 242 of the flexible board terminals 242 and 243 is connected, in terms of design, with the transparent electrode terminal 223 of the color filter substrate 220 via the ACF, while the dummy terminal 243 is not connected, in terms of design, with the transparent electrode terminal 223. Moreover, the dummy terminal 243 is not connected anywhere in the CF flexible board 240 and thus is in a floating state. That is, the dummy terminal 243 is formed at the arrangement pitch of the transparent electrode terminals 223 so that the dummy terminal 243 is inserted between the transparent electrode terminals 223 adjacent to each other.

Figure 5:
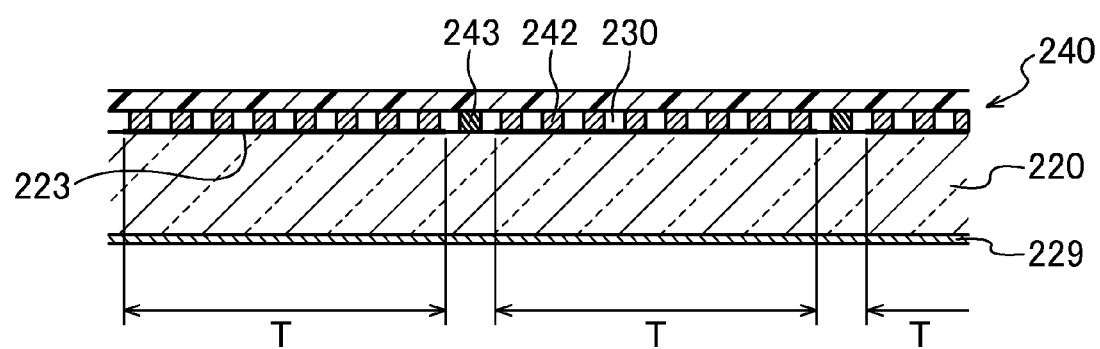
FIG. 5 is a partial cross-sectional view showing in detail the connection between the flexible board and the counter substrate.

FIG. 5 is a partial cross-sectional view showing in detail the connection between the CF flexible board 240 and the color filter substrate 220. As shown in the drawing, the transparent electrode terminals 223 of the color filter substrate 220 and the flexible board terminals 242 of the CF flexible board 240 are connected via an ACF 230. As shown in the drawing, one transparent electrode terminal 223 has a width T and is connected with the plurality of flexible board terminals 242. Moreover, it is designed such that a gap is provided between the transparent electrode terminal 223 and the transparent electrode terminal 223 so as to allow one flexible board terminal (dummy terminal) 243 to be inserted therebetween. The transparent electrode terminal 223 is formed to be very thin, with a thickness of about 0.01 µm. Therefore, even when the transparent electrode terminal 223 is not connected with the flexible board terminals 242 and 243 having a height of 20 µm, the flexible board terminals 242 and 243 do not float. Moreover, the ACF 230 has uniform fluidity and pressure due to the adjacent flexible board terminals 242 and 243 being arranged at a constant pitch. Therefore, the flexible board terminals 242 and 243 need to be arranged at a constant pitch. Moreover, especially for maintaining the adhesion of the ACF, the ratio of areas of the flexible board terminals 242 and 243 to other portions than these terminals needs to be 1:1. By arranging the flexible board terminal 242 and the dummy terminal 243 so as to have the same terminal width and terminal gap, the flow of conductive particles in the ACF can be made uniform, making it possible to reliably establish electrical continuity between the flexible board terminal 242 and the electrode terminal.

Figure 6:
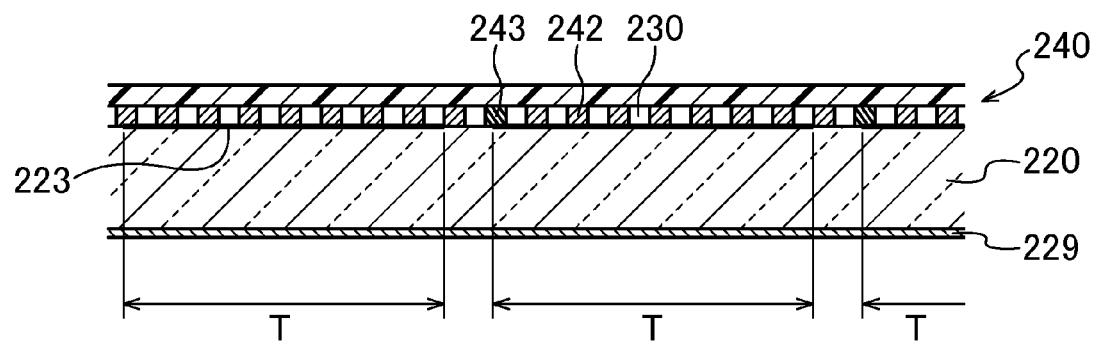
FIG. 6 is a partial cross-sectional view showing the case where the connection between the flexible board and the counter substrate are shifted in FIG. 5.

FIG. 6 is a partial cross-sectional view showing the case where the connection between the CF flexible board 240 and the color filter substrate 220 are shifted. As described above, it is difficult, due to the presence of the light shielding film 229, to make a connection or the like with high accuracy using an alignment mark. Therefore, as shown in the drawing, it is conceivable that the transparent electrode terminal 223 might be displaced from the flexible board terminal 242 to be connected and might be connected with the dummy terminal 243 adjacent to the transparent electrode terminal 223. Also in such a case, since the dummy terminal 243 is in an electrically floating state, there is no electrical influence on a touch panel function even when electrical continuity is established between the dummy terminal 243 and the transparent electrode terminal 223. Therefore, the connection is allowable as a product.

Figure 7:
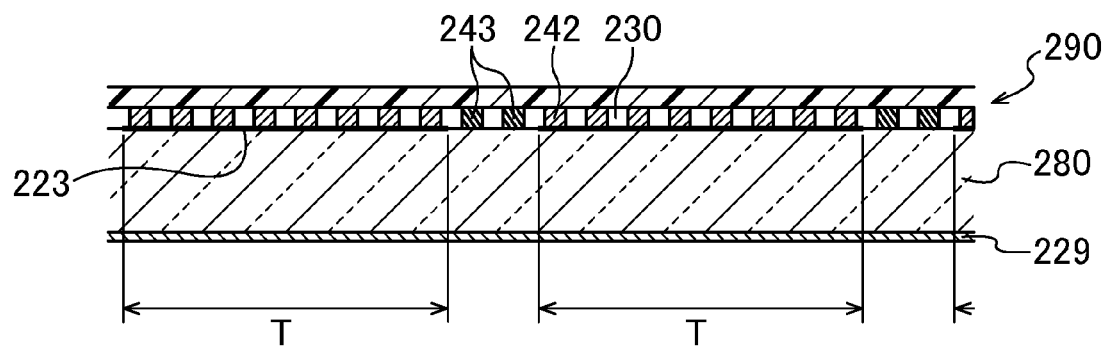
FIG. 7 is a partial cross-sectional view showing in detail a connection between a flexible board and a counter substrate according to a modified example of the embodiment.

FIG. 7 shows a partial cross section showing a connection between a CF flexible board 290 and a color filter substrate 280 according to a modified example of the embodiment. Similarly to the case of FIG. 5, the transparent electrode terminals 223 of the color filter substrate 280 and the flexible board terminals 242 of the CF flexible board 290 are connected via the ACF 230. The modified example is different from the case of FIG. 5 in that it is designed, in the connection between the color filter substrate 280 and the CF flexible board 290, such that a gap is provided between the transparent electrode terminals 223 adjacent to each other so as to allow two flexible board terminals (dummy terminals) 243 to be inserted therebetween.

Figure 8:
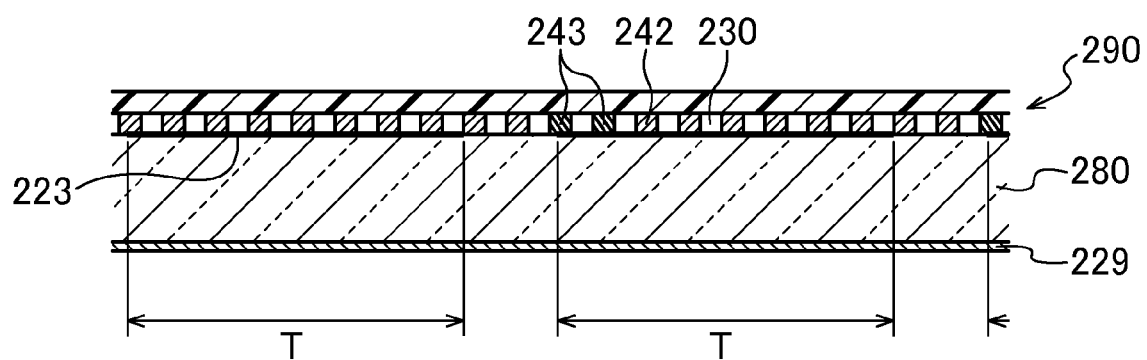
FIG. 8 is a partial cross-sectional view showing the case where the connection between the flexible board and the counter substrate are shifted in FIG. 7.

FIG. 8 shows the case where in the modified example of FIG. 7, the connection between the CF flexible board 290 and the color filter substrate 280 are shifted by a distance corresponding to about two arrangement pitches of the flexible board terminals 242 and 243. Even in such a case, since the two dummy terminals 243 that are successively arranged are in an electrically floating state, there is no electrical influence on a touch panel function even when electrical continuity is established between the two dummy terminals 243 and the transparent electrode terminal 223. Therefore, the connection is allowable as a product. In the embodiment and modified example described above, a gap is provided between the transparent electrode terminals 223 adjacent to each other so as to allow one or two flexible board terminals (dummy terminals) 243 to be inserted therebetween. However, the number of flexible board terminals (dummy terminals) may be three or more.

As has been described above, in the liquid crystal display device with a touch panel according to the embodiment, an electric signal can be extracted from over the color filter substrate. Moreover, even in the case where a connection with high accuracy is difficult and shifting of connection is present, an electric signal can be extracted from over the color filter substrate.

In the embodiment, the liquid crystal display panel with a touch panel has been described by way of example. However, the invention is not limited thereto and can be applied to other display devices. For example, an organic EL display device may be used as a display device. In this case, a counter substrate is a sealing substrate. Moreover, the embodiment can also be applied to a display device in which a color filter substrate is overlapped with a white light emitting organic EL.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device with a touch panel comprising:
  a thin film transistor substrate on which thin film transistors are formed corresponding to pixels formed in a display area; and
  a counter substrate arranged to face the thin film transistor substrate, wherein
  the counter substrate, having a front surface and a back surface, includes, on the back surface, a light shielding film surrounding the display area and forming a light shielding area surrounding the display area,
  the counter substrate includes, on the front surface, a plurality of detection electrodes extending in one direction across the display area and detecting a contact position when a contact from the outside is formed on the display area, and a plurality of electrode terminals connected to the detection electrodes,
  a flexible board configured for receiving a signal from the detection electrodes is connected to the counter substrate,
  the flexible board has a plurality of flexible board terminals,
  the electrode terminals and the flexible board terminals are connected in the light shielding area,
  the electrode terminals have overlapping regions each of which overlaps, in a plan view, with the flexible board which has the plurality of flexible board terminals,
  all areas of the overlapping regions overlap with the light shielding film in the plan view,
  the electrode terminals are transparent conductive films,
  an arrangement pitch of the plurality of flexible board terminals and an arrangement pitch of the plurality of electrode terminals are different from each other,
  the electrode terminals are wider than the detection electrodes in the light shielding area, and
  the electrode terminals are connected with the flexible board terminals through anisotropic conductive film.

2. The display device with a touch panel according to claim 1, wherein
  the counter substrate is a color filter that transmits light in a predetermined wavelength range for each of the pixels, and the detection electrodes and the electrode terminals are each formed of a transparent conductive film.

3. The display device with a touch panel according to claim 1, wherein
each of the plurality of electrode terminals is electrically connected with two or more of the flexible board terminals, and
a portion of the plurality of flexible board terminals is a dummy terminal that is in an electrically floating state in the flexible board.

4. The display device with a touch panel according to claim 3, wherein
the dummy terminal is formed at the arrangement pitch of the plurality of electrode terminals.

5. The display device with a touch panel according to claim 3, wherein
two or more of the dummy terminals are successively arranged.

6. The display device with a touch panel according to claim 1, wherein
thicknesses of the electrode terminals are thinner than and thicknesses of the flexible board terminals.

7. The display device with a touch panel according to claim 3, wherein
a width of the dummy terminal and a width of one of the flexible board terminals are same.

8. The display device with a touch panel according to claim 3, wherein
a gap between the dummy terminal and one of the flexible board terminals is same as a gap between the flexible board terminals.

9. The display device with a touch panel according to claim 1, wherein
the plurality of flexible board terminals includes a first group of the flexible board terminals, a second group of the flexible board terminals, and a dummy electrode terminal located between the first group and the second group, and
the first group contacts one of the electrode terminals and the second group contacts one of the electrode terminals.

10. A display device with a touch panel comprising:
a thin film transistor substrate on which thin film transistors are formed corresponding to pixels formed in a display area; and
a counter substrate arranged to face the thin film transistor substrate, wherein
the counter substrate, having a front surface and a back surface, includes, on the back surface, a light shielding film surrounding the display area and forming a light shielding area surrounding the display area,
the counter substrate includes, on the front surface, a plurality of detection electrodes extending in one direction across the display area and detecting a contact position when a contact from the outside is formed on the display area, and a plurality of electrode terminals connected to the detection electrodes,
a flexible board configured for receiving a signal from the detection electrodes is connected to the counter substrate,
the flexible board has a plurality of flexible board terminals,
the electrode terminals and the flexible board terminals are connected in the light shielding area,
the electrode terminals have overlapping regions each of which overlaps, in a plan view, with the flexible board which has the plurality of flexible board terminals,
all areas of the overlapping regions overlap with the light shielding film in the plan view,
the electrode terminals are transparent conductive films,
an arrangement pitch of the plurality of flexible board terminals and an arrangement pitch of the plurality of electrode terminals are different from each other,
the electrode terminals are wider than the detection electrodes in the light shielding area,
the plurality of flexible board terminals includes a first group of the flexible board terminals, a second group of the flexible board terminals and a dummy electrode,
the flexible board terminals of the first group are adjacent each other and which are electrically connected by wirings on the flexible board,
the flexible board terminals of the second group are adjacent each other and which are electrically connected by wirings on the flexible board, and
the dummy electrode is arranged between the first group and the second group.

11. The display device with a touch panel according to claim 10, wherein
the counter substrate is a color filter that transmits light in a predetermined wavelength range for each of the pixels, and
the detection electrodes and the electrode terminals are each formed of a transparent conductive film.

12. The display device with a touch panel according to claim 10, wherein
each of the plurality of electrode terminals is electrically connected with two or more of the flexible board terminals, and
a portion of the plurality of flexible board terminals is a dummy terminal that is in an electrically floating state in the flexible board.

13. The display device with a touch panel according to claim 12, wherein
the dummy terminal is formed at the arrangement pitch of the plurality of electrode terminals.

14. The display device with a touch panel according to claim 12, wherein
two or more of the dummy terminals are successively arranged.

15. The display device with a touch panel according to claim 10, wherein
thicknesses of the electrode terminals are thinner than and thicknesses of the flexible board terminals.

16. The display device with a touch panel according to claim 12, wherein
a width of the dummy terminal and a width of one of the flexible board terminals are same.

17. The display device with a touch panel according to claim 12, wherein
a gap between the dummy terminal and one of the flexible board terminals is same as a gap between the flexible board terminals.

18. The display device with a touch panel according to claim 10, wherein
the electrode terminals are connected with the flexible board terminals through anisotropic conductive film.

19. The display device with a touch panel according to claim 9,
wherein the first group connects with a line on the flexible board via a joining portion.

20. The display device with a touch panel according to claim 10, wherein the first group contacts one of the electrode terminals and the second group contacts one of the electrode terminals.

21. The display device with a touch panel according to claim 20,
wherein the first group connects with a line on the flexible board via a joining portion.

\* \* \* \* \*